UNITED STATES PATENT OFFICE.

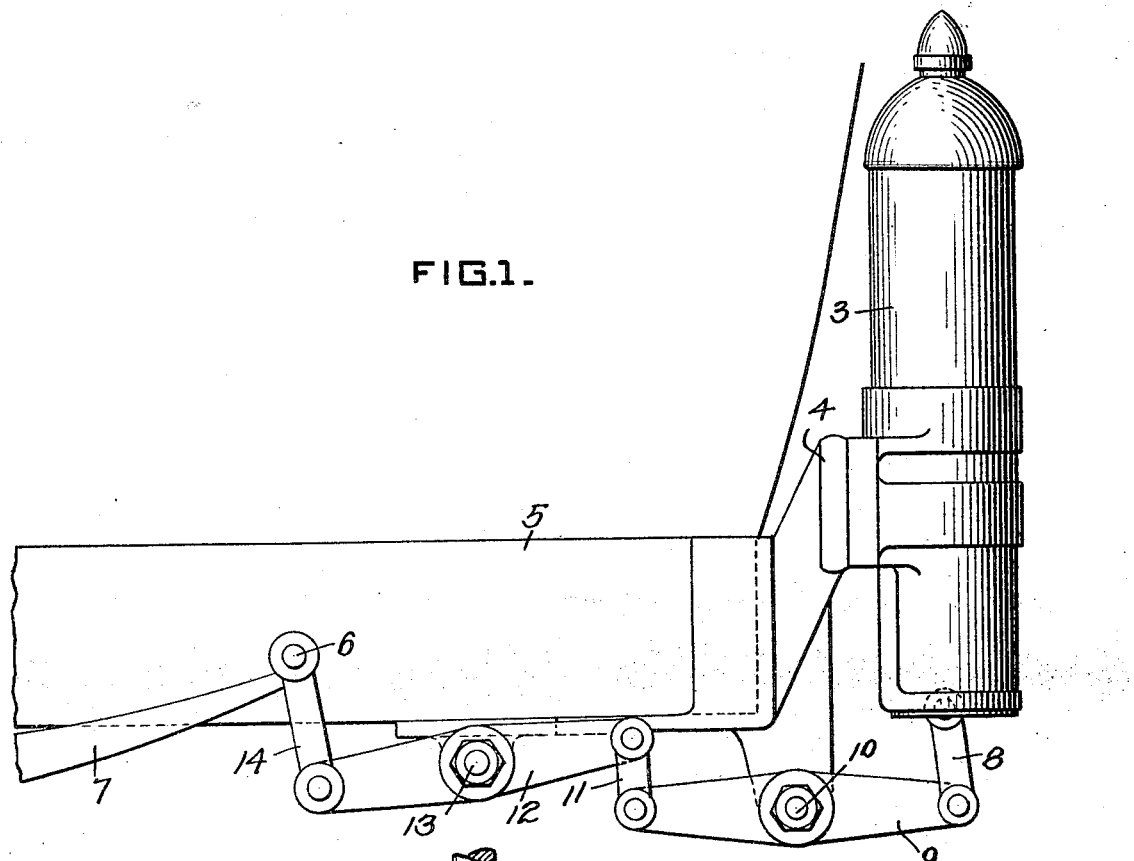
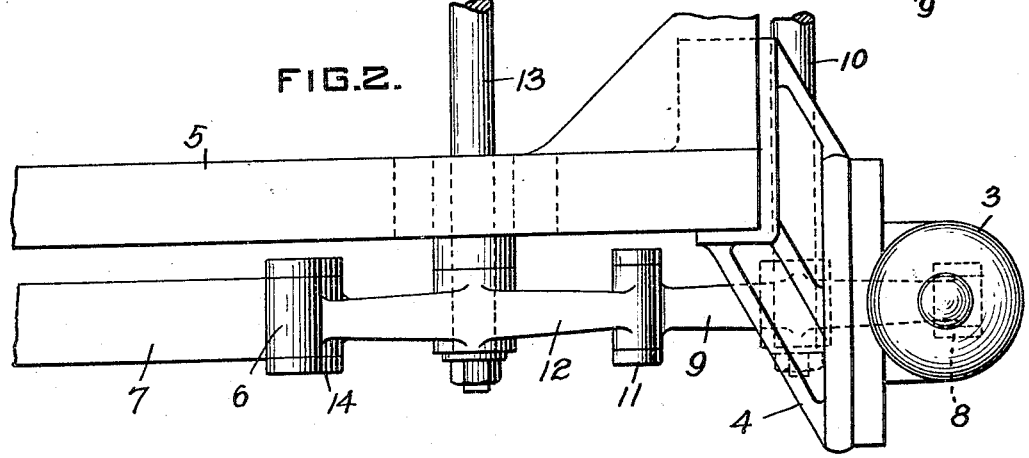

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AIR-SPRING SUSPENSION.

1,410,934.  Specification of Letters Patent.  Patented Mar. 28, 1922.

Application filed February 26, 1919. Serial No. 279,431.

*To all whom it may concern:*

Be it known that I, RICHARD LIEBAU, a citizen of the United States, and a resident of New Haven, in the county of New Haven and State of Connecticut, have made a new and useful Invention in Air-Spring Suspensions, of which the following is a specification.

In the use of air springs of the Westinghouse type which is a telescopic spring one member of which is secured to the load platform of the vehicle while the other member is secured to the adjacent end of the steel spring, it is often difficult especially on trucks having a large body overhang to connect up the air springs to the steel springs.

The air springs of the Westinghouse type are installed so as to operate in series with the steel springs of the vehicle and an object of this invention is to provide means for connecting up the air spring to the steel springs in vehicles in which the body overhangs or extends a considerable distance beyond the end of the adjacent steel spring whether the overhand occurs laterally or endwise of the vehicle and this object I attain in the device described in the specification and illustrated in the drawings accompanying the same and forming a part of this application.

In the drawings, Figure 1 is a view in side elevation of a device embodying this invention and shows one end of the load platform and one end of the adjacent steel spring as well as an air spring and the device for coupling the air spring to the steel spring.

Fig. 2 is a plan view of the device shown in Fig. 1.

An air spring 3 by means of a bracket 4 is secured to one corner of the rear of the load platform 5 of the vehicle. As will be seen in the drawings this load platform overhangs or extends a considerable distance beyond eye 6 of the rear steel spring 7. The inner telescopic member of the air spring (not shown) by means of a shackle 8 is connected up to one end of a lever 9 loosely mounted on a through shaft 10 which extends across the vehicle from one side to the other and is utilized as a support for the two corresponding levers 9. The other end of lever 9 by means of a shackle 11 is connected up to one end of a lever 12 mounted on a through shaft 13 running parallel to shaft 10 and extending to the opposite side of the load platform. A shackle 14 connects the other end of lever 12 with the spring 7 by means of a bolt which passes through the spring eye.

Having thus described my invention what I claim is—

In combination with the leaf spring of a vehicle, a load platform extending beyond the leaf spring, a telescopic air spring secured to said load platform beyond said leaf spring, a plurality of levers supported by said load platform and lying in the same plane and between one end of said leaf spring and said air spring, a shackle connecting said levers, and shackles connecting said levers to said steel spring and air spring, respectively.

In testimony whereof, I have hereunto subscribed my name this 2nd day of December, 1918.

RICHARD LIEBAU.